United States Patent
Senter et al.

[15] 3,696,689
[45] Oct. 10, 1972

[54] SAFETY HOUSING

[72] Inventors: Louis Senter; Robert E. Johnson, both of Los Angeles, Calif.

[73] Assignee: Whittaker Corporation

[22] Filed: Feb. 12, 1971

[21] Appl. No.: 114,826

[52] U.S. Cl. ................................74/609, 180/82
[51] Int. Cl. .............................................F16p 1/02
[58] Field of Search ...........74/609, 608, 606; 180/82

[56] References Cited

UNITED STATES PATENTS

| | | | |
|---|---|---|---|
| 1,824,440 | 9/1931 | Meyer | 74/606 |
| 3,455,409 | 7/1969 | Clark | 74/608 X |

*Primary Examiner*—William F. O'Dea
*Assistant Examiner*—F. D. Shoemaker
*Attorney*—Donald E. Nist and Jay H. Quartz

[57] ABSTRACT

This invention includes a bell housing and a deflector plate which is connected to and which covers the open end of the bell housing to form, in combination, a safety housing for containing, inter alia, flywheel fragments. The safety housing substantially encloses both a clutch assembly and a flywheel which is carried on a crankshaft extending through the deflector plate and is connected at its forward end to an engine block and at its rearward end to a transmission housing. The bell housing is formed from a high ductile metal and the deflector plate is formed from a metal of medium ductility. The bolts used to interconnect them are formed from a high tensile and, preferably, low ductile metal so that deformation of the bell housing causes similar deformation of the deflector plate. Attachment of the safety housing to the engine block is preferably by soft metal bolts.

10 Claims, 3 Drawing Figures

INVENTORS.
LOUIS SENTER,
ROBERT E. JOHNSON,
By Donald E. Nist
& Jay H. Quait
ATTORNEY

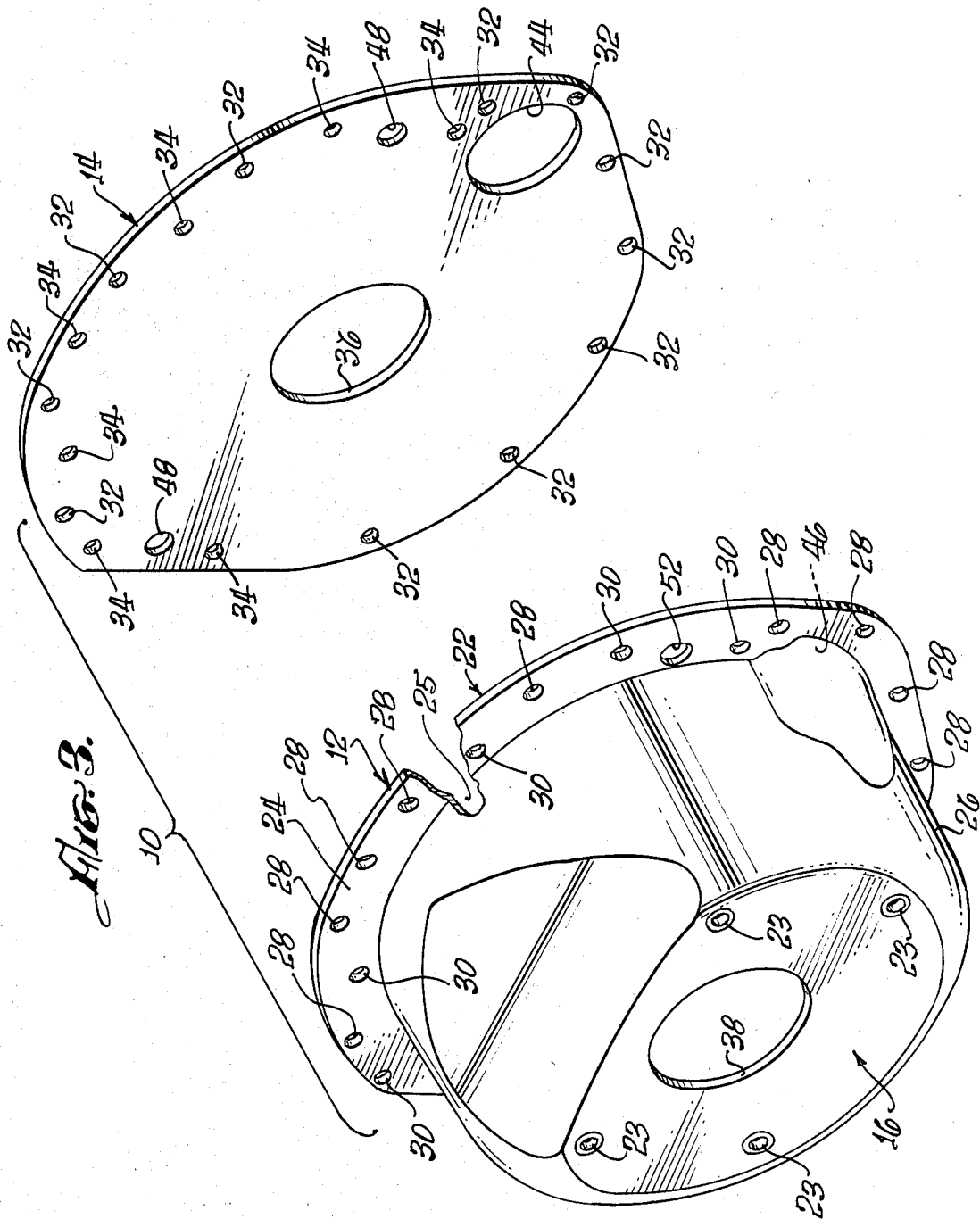

SAFETY HOUSING

BACKGROUND OF THE INVENTION

This invention relates to automotive components and, more specifically, to a safety housing for enclosing a flywheel and clutch assembly.

In high performance automobiles such as racing cars, engine speeds can reach and exceed 8,000 rpm. At these speeds, the flywheel and/or clutch assembly can disintegrate into numerous high-velocity fragments which, in turn, can damage the engine block and other components and can injure the car's occupants if permitted to escape from the bell housing. Presently employed clutch bell housings are not capable of containing such fragments with the result that the aforementioned vehicle damage and occupant injury has occurred when flywheels and clutches have exploded within such housings.

To protect the engine, a deflector plate can be mounted in front of a standard bell housing between the latter and the engine block. However, this assembly constitutes only a partial solution since it does not contain flying parts but only deflects them away from the engine block. To contain the broken parts, the walls of the bell housing could be thickened using, for example, inch-thick steel and/or an inordinately large number of bolts could be employed to hold a deflector plate and bell housing together. While these changes might provide satisfactory parts containment, their use would be very expensive and the additional weight would be unacceptable, particularly in race cars where every attempt is made to lighten the car without sacrificing safety and performance. Thus, at present, no safety housing exists which will contain flywheel fragments to the satisfaction of race-car governing bodies.

SUMMARY OF THE INVENTION

The safety housing of this invention comprises a deflector plate which is preferably bolted to a bell housing to cover the open end of the latter. The deflector plate has a generally centrally disposed opening to accommodate a crankshaft extending into the bell housing and carrying a flywheel thereon. The bell housing is sized to accommodate both the flywheel and a clutch assembly. The safety housing is attached at its forward end to the engine block and at its rearward end to a transmission housing.

The bell housing is made from high ductile metal and the deflector plate is made from a metal of medium ductility. The bolts attaching these two components together are made from high tensile metal. Preferably, the bolts employed to interconnect the safety housing and engine block are formed from a soft metal.

The particular combination of components comprising the herein-described safety housing and the particular materials employed to form these components cooperate to contain flywheel and other high velocity fragments. This is accomplished by (a) providing an enclosure (deflector plate and bell housing combination) and (b) using materials to form the components of the enclosure so that tears in the bell housing are minimized and so that deflection or distortion of the bell housing produces a similar deflection or distortion in the deflector plate. In this way, the integrity of the safety housing is substantially maintained.

DESCRIPTION OF THE DRAWINGS

FIG. 3 is an exploded perspective view of the bell housing and deflector plate comprising the herein-described safety housing.

DESCRIPTION OF THE PREFERRED EMBODIMENT

Figure 1:
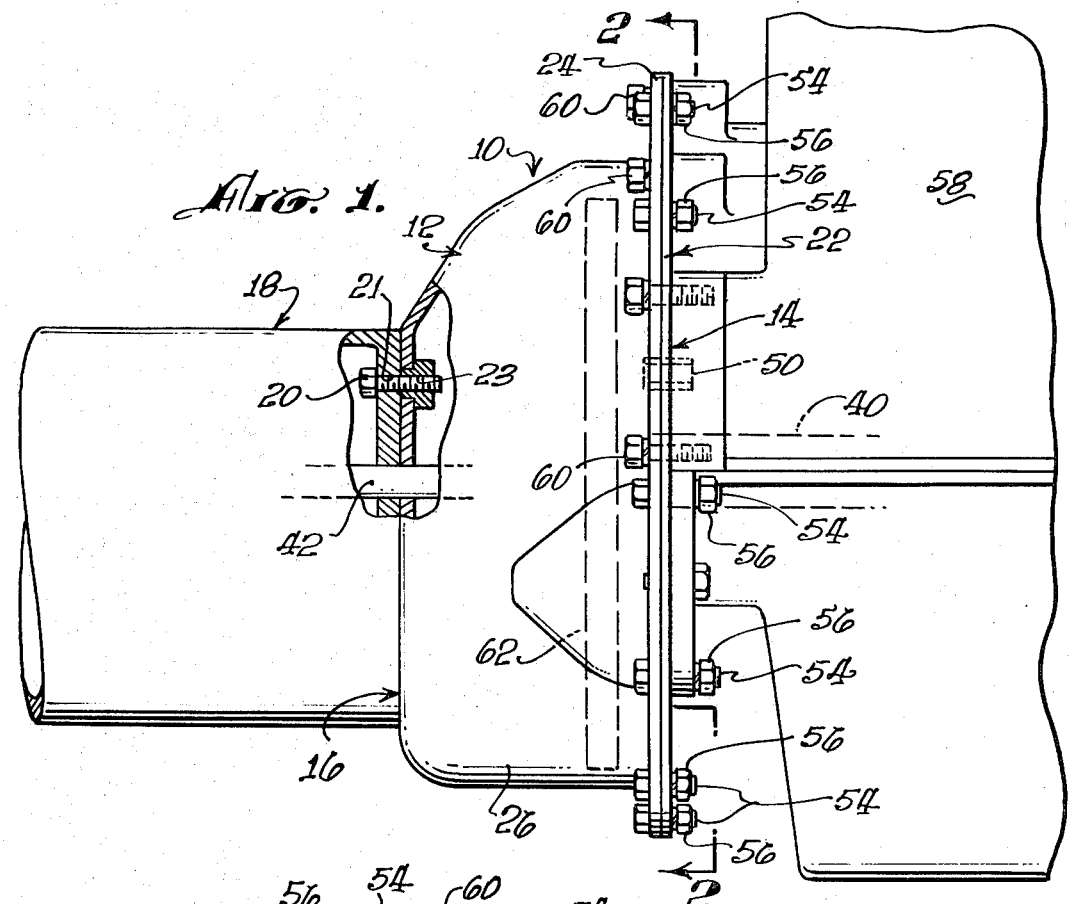
FIG. 1 is a side elevational view of the safety housing of this invention in partial section showing it positioned between a transmission cover and an engine block and showing a flywheel carried on a crankshaft within a bell housing.

In general, the herein-described safety housing includes a bell housing having an open end which is substantially covered by and fixedly connected to a deflector plate. The safety housing is connected at its rearward end to a transmission cover and at its forward end to an engine block and encloses a flywheel and clutch assembly. The bell housing is formed from a high ductile metal and the deflector plate is formed from a medium ductile metal. The bell housing and deflector plate are interconnected using high tensile bolts so that the safety housing tends to act as a strong, yet elastic, energy absorber too contain flying parts.

Turning now to the Figures, the numeral 10 designates the herein-described safety housing which includes a normally, rearwardly disposed bell housing 12 and a forwardly disposed deflector plate 14. The rearward, closed end 16 of the bell housing 12 is fixedly connected to a transmission housing 18 by bolts 20 passing through aligned holes 21,23 in the transmission housing and bell housing, respectively, so that its open end 22 is forwardly disposed. The inner edge of an annular flange 24 positioned transaxially of the longitudinal axis of the bell housing 12 and forming a shoulder extending radially outwardly from the forward end of the main body 26 of the bell housing defines a large axial opening 25 in the open end 22 of the bell housing. The annular flange 24 itself is perforated and defines two series of openings 28,30 extending radially around the flange.

With reference to FIG. 3, the deflector plate 14 is sufficiently large to cover the opening 25 in the forward open end 22 of the bell housing 12 and has substantially the same shape as is described by the periphery of the annular flange 24 of the bell housing. Two series of apertures 32,34 are spaced radially about the deflector plate 14 adjacent its periphery and are aligned with the two series of holes 28,30, respectively, in the annular flange 24 when the bell housing 12 and deflector plate are interconnected.

The deflector plate 14 and rearward end 16 of the bell housing 12 each has a centrally disposed opening 36,38, respectively, for receiving a crankshaft 40 (FIGS. 1 and 2) and a drive shaft 42 (FIG. 1) respectively. The deflector plate 14 also has an enlarged, peripheral opening 44 which is aligned with a similarly sized opening 46 in the bell housing to accommodate a starter motor (not shown). A pair of additional holes 48 are provided in the deflector plate 14 to receive dowel pins 50 (shown as tubes in FIG. 1 and 2) extending through aligned holes 52 in the annular flange 24 of the bell housing to aid in centering the crankshaft 40.

The bell housing 12 and deflector plate 14 are interconnected by a plurality of tie bolts 54 extending through the first series of apertures 28,32 in each of the bell housing and deflector plate, respectively, and locked together by nuts 56 threaded onto the tie bolts 54. Additionally, the safety housing 10 is connected to an engine block 58 by block bolts 60 extending through the second series of apertures 30,34 in the bell housing 12 and deflector plate 14, respectively, and into aligned holes (not shown) in the engine block.

When so assembled, the crankshaft 40 extends through the opening 36 in the deflector plate 14 into the bell housing 12. A flywheel 62 is carried on the crankshaft 42. Its rotation is initiated by the starter motor acting through a drive gear 64. A clutch assembly (not shown) is entirely contained within the bell housing 12 and interconnects the flywheel 62 and drive shaft 42 to transmit power from the former to the latter. Thus, it will be seen that the flywheel 62 is completely enclosed within the safety housing 10.

The bell housing 12 is formed from a metal having sufficient ductility to absorb the energy of broken flywheel or clutch parts without significant opening or tearing of the bell housing wall. The high ductile metal employed for the bell housing 12 should have an elongation of at least about 30 percent (70° F). Suitable metals include low carbon standard steels having a maximum carbon content of about 0.10 percent and, preferably, a carbon content of about 0.06 percent. Examples of such steels are 1004, 1006 and 1008 steels (AISI designations). The latter have elongations between about 30 - 36 percent (70°F). If metals having elongations less than about 30 percent are employed for the bell housing 12, the latter will tear too much to retain broken parts.

The deflector plate 14 is formed from a metal having sufficient ductility to absorb the energy of broken flywheel or clutch fragments without breaking or tearing and yet have sufficient hardness to prevent the tie bolts 54 from being pulled through the deflector plate when the bell housing 12 is distorted by impact from such fragments. Such a metal is herein described as a "medium ductile" metal having an elongation between about 28 percent and about 25 percent. Suitable metals include 1015, 1020 and 1025 hot-rolled standard steels (AISI designation). Above about 28 percent elongation (1015 standard steel), the metal is too soft and the tie bolts 54 pull through the deflector plate 14 and/or cause edge pieces of the deflector plate to pull or break off. Below about 25 percent (1025 standard steel), the material for the deflector plate 12 is too hard to deform as required with the result that substantial separation of bell housing 12 and deflector plate 14 can occur to permit broken flywheel 62 or clutch parts to escape from the safety housing 10.

Use of the aforementioned high ductile metal for the bell housing 12 provides the requisite elasticity (and strength) to allow the bell housing to "give" when impacted by flywheel fragments to thereby absorb much of the energy of the fragments without substantially opening up or otherwise breaking so that the fragments are contained within the housing. Additionally, the use of a medium ductile metal for the deflector plate 14 permits the latter to "give" sufficiently when impacted by high velocity fragments to absorb the energy of such fragments without significantly breaking or tearing and yet offer sufficient resistance to the tie bolts 54 to prevent them from pulling through or fracturing the deflector plate 14 when distortions in the bell housing, due to fragment impact, tend to separate the bell housing from the deflector plate. Furthermore, the deflector plate 14 has sufficient elasticity to warp or bend in substantial conformity with warping or bending of the annular flange 24 when the latter is distorted by fragmentation of the flywheel 62 or clutch to thereby minimize gaps between the deflector plate 14 and bell housing 12.

In contrast, if the bell housing 12 is formed from highly ductile metal and the deflector plate 14 is formed from low ductile metal, the housing and plate will separate because distortion of the bell housing flange 24 will not be followed by similar distortion of the deflector plate. This combination will also tend to cause the bolts 54 interconnecting the housing and plate to shear. On the other hand, if the bell housing 12 is formed from low ductile metal and the deflector plate 14 is formed from medium ductile metal, the housing will tear and the bolts 54 will shear with resulting partial separation of bell housing and plate. Such separation can allow flywheel fragments to escape from the safety housing 10 to cause further damage. If the both bell housing 12 and deflector plate 14 are formed from hard, low ductile metal, e.g., 4130 Cr-Mo steel, both components may rupture and the bolts 54 may shear, thereby allowing escape of flywheel fragments.

The tie bolts 54 employed to interconnect the bell housing 12 and deflector plate 14 are formed from a high tensile strength metal and, preferably, from such a metal exhibiting low ductility. The high tensile strength is necessary to give the tie bolts 54 sufficient strength to resist shearing forces applied to the bolts by the tendency of the bell housing 12 and deflector plate 14 to separate from each other when impacted by flywheel 62 or clutch parts. Use of a material which also has low ductility is preferred to minimize separation of the bell housing 12 and deflector plate 14 due to elongation of the tie bolts 54. The high strength and low ductility permit the bell housing 12, when "giving," to pull the deflector plate 14 with it to maintain the integrity of the safety housing 10. High ductile metals, in contrast, would allow the tie bolts 54 to elongate as the bell housing 12 was deformed and thereby permit undesirable separation of the bell housing from the deflector plate 14. The tie bolts 54 employed herein are made from Grade 8 steel. A specific suitable metal is 4130 Cr-Mo steel having a tensile strength of 234,000 psi. (after heat treatment) and an elongation of about 12 percent (70° F).

By using high strength tie bolts 54, deformation of the bell housing 12 along the annular flange 24 is accompanied by a similar deformation of the deflector plate 14 because both bell housing and deflector plate are formed from ductile metal which permits expansion and because the tie bolts 54 efficiently transmit expansion of the bell housing to the deflector plate so that the latter can deform with the bell housing, thereby preserving the unitary character of the safety housing 10. Because the integrity of the safety housing 10 is so well preserved, it is possible to distort the engine block 58 when the flywheel 62 or clutch assembly breaks since the safety housing will tend to pull away from the engine block. To prevent such damage to the engine block 58, the block bolts 60 employed to connect the safety housing 10 to the block are preferably low strength, Grade 1 bolts. The dowel pins 50 are also made from a low strength, Grade 1 metal to function in the same manner as the block bolts 60.

This invention will be further described by the following example.

EXAMPLE

A series of tests were run in accordance with proposed S.E.M.A. Spec. 6-2 (as of Sept. 28, 1970).

An engine block was positioned on a test stand so that its rearward end projected into and was enclosed by a metal box having reinforced walls to prevent escape of fragments. A deflector plate made from 3/16 inch 1020 steel substantially as shown in FIG. 3 was attached to the rear of the engine block. A cast iron flywheel (Standard Chevrolet '55-'57) of about 14 inches in diameter and weighing about 55 lb. was fitted onto a crankshaft extending from the engine block after slits, radially extending outwardly from the center bore through each attach bolt hole a distance sufficient to cause the flywheel to break at about 8,000 rpm, were cut into the flywheel. This flywheel had the largest diameter and greatest weight commercially available for use in the safety housing employed in this test. A clutch pressure clutch (but not the clutch disc) was thereafter attached to the flywheel. A bell housing was connected to the deflector plate and both were connected to the engine block as shown in FIG. 1. A door on the open end of the box was closed so that the safety housing was totally enclosed therein.

Figure 2:
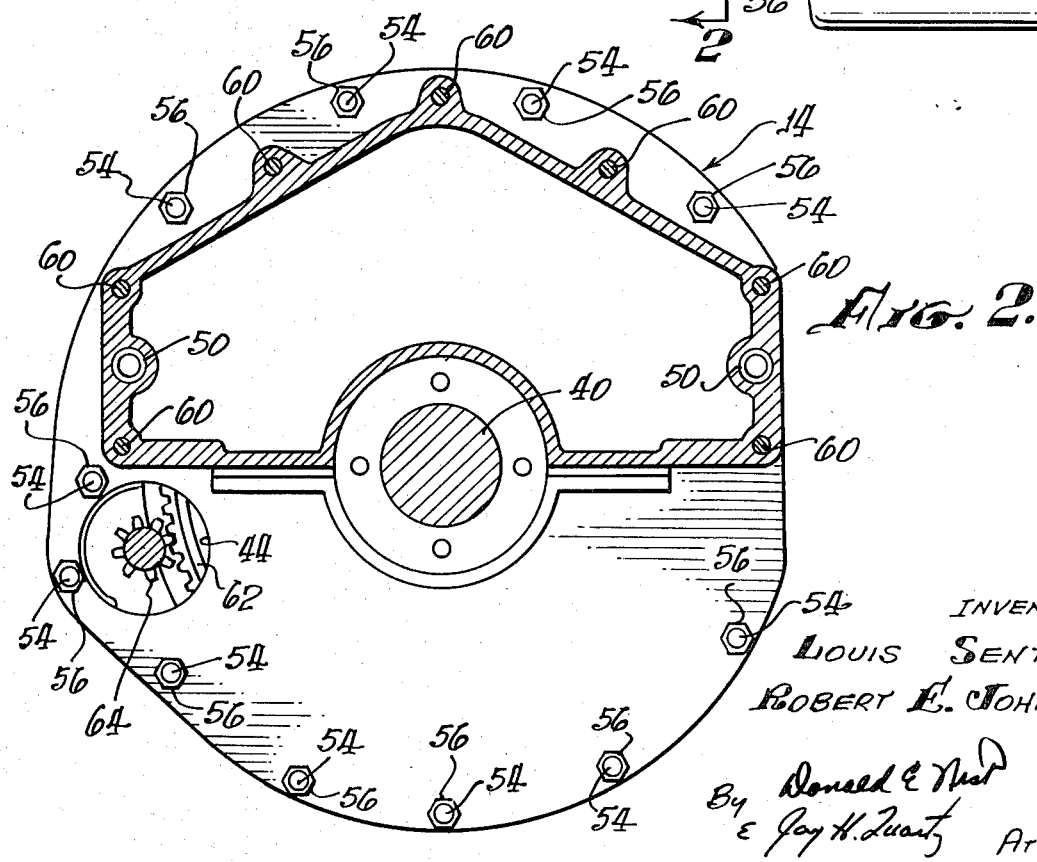
FIG. 2 is a partial sectional view taken along the line 2—2 of FIG. 1 showing a portion of the rear end of the engine block in section and showing the deflector plate.

The bell housing was made from 0.25 inch thick 1006 steel and the tie bolts interconnecting the plate and bell housing were 0.375 in. diam. bolts made from 4130 Cr-Mo steel. The block bolts were 0.375 in. diam. bolts made from Grade 1 steel. The dowel pins (tubular as shown in FIGS. 1 and 2) were ⅝ in. O.D. × 1/16 in. thick wall from standard steel tubing.

The flywheel was rotated at approximately 8,000 rpm until it broke. This test was repeated several times. In each instance, no components escaped from the safety housing and the engine block was undamaged. Although there was some separation of the bell housing from the deflector plate, no one opening was more than 0.5 in. wide or 4 in. long. The most number of tie bolts that were broken in any test was 4. No holes in the bell housings exceeded 0.750 in. in thickness or 3 in. in length.

Identical tests were performed on housings having the following characteristics: (1) bell housing — 0.25 in. thick 1035 steel; deflector plate — 3/16 in. thick 1020 steel; tie bolts — 0.375 in diam. 4130 Cr-Mo steel; (2) bell housing — 0.25 in. thick 1035 steel; deflector plate — 3/16 in. thick 4130 Cr-Mo steel; tie bolts — 0.375 in. diam. 4130 Cr-Mo steel.

In test (1), the bell housing steel was less ductile than that required for the herein-described invention. The remaining components met the requirements of this invention. However, in spite of this single difference, the housing was not able to contain the broken flywheel fragments. The bell housing split open and pulled most of the tie bolts through the deflector plate thereby also separating from the deflector plate. The tie bolts pulled through the deflector plate even though it was made from 1020 steel because the effect of the bell housing splitting was to unevenly load the tie bolts so that each was required to resist a substantially greater force than is normally required when a load is distributed uniformally on each.

In test (2), both the bell housing and deflector plate were made from less ductile steels than is required by this invention. However, it will be noted that the bell housing and deflector plate had higher tensile strengths than their counterparts in the aforedescribed test of the safety housing of this invention. In spite of this greater strength, the housing of test (2) failed. Again the housing split. The tie bolts sheared in spite of their high strength and a piece of the deflector plate broke off.

From the comparison of the foregoing tests, it will be understood that strength alone is not sufficient to provide a satisfactory safety housing. Instead, both the bell housing and deflector plate must have substantial ductility although the latter must have somewhat less ductility and correspondingly greater strength than the former. Additionally, from test (1), it will be understood that each of the components of the safety housing must have the characteristics described herein.

We claim:

1. A vehicle safety housing for mounting between an engine block and a transmission, comprising:
   a bell housing sized to accommodate a flywheel and a clutch assembly and having an open end disposed toward said engine block, said bell housing formed from a high ductile metal having an elongation greater than about 30 percent (70° F) to substantially absorb the energy of flywheel and clutch assembly fragments and to substantially prevent the escape of said fragments therethrough;
   a deflector plate disposed between said engine block and said bell housing and sized to cover said open end of said bell housing, said deflector plate formed from a medium ductile metal having an elongation between about 25 percent and about 28 percent (70° F); and
   tie bolt means for interconnecting said bell housing and said deflector plate, said tie bolt means formed from a high tensile strength metal to substantially resist shearing of said tie bolt means upon attempted separation of said bell housing and said deflector plate from each other.

2. The safety housing of claim 1 wherein said high ductile metal of said bell housing is a low carbon steel selected from the group consisting of 1004, 1006 and 1008 (AISI designation) steel.

3. The safety housing of claim 2 wherein said medium ductile metal is a steel selected from the group consisting of 1015, 1020 and 1025 hot-rolled standard steel (AISI designation).

4. The safety housing of claim 1 wherein said high tensile metal has low ductility so that separation of said bell housing from said deflector plate is substantially prevented.

5. The safety housing of claim 4 wherein said high tensile, low ductile metal is a Grade 8 steel.

6. The safety housing of claim 5 wherein said steel is 4130 Cr-Mo steel.

7. The safety housing of claim 1 including, in addition, block bolt means for connecting said bell housing and said deflector plate to said engine block, said block bolt means formed of a soft metal which elongates if said deflector plate is caused to separate from said engine block to thereby prevent said engine block from warping.

8. A safety housing for mounting between an engine block and a transmission, comprising:

a bell housing sized to accommodate a flywheel and a clutch assembly and having an open end disposed toward said engine block, said bell housing formed from a steel selected from the group consisting of 1004, 1006 and 1008 steel (AISI) having an elongation between about 30 percent and about 36 percent (70° F);

a deflector plate disposed between said bell housing and said engine block and sized to cover said open end of said bell housing, said deflector plate formed from a steel selected from the group consisting of 1015, 1020 and 1025 hot-rolled standard steel having an elongation between about 28 percent and about 25 percent;

and tie bolt means for interconnecting said bell housing and said deflector plate, said tie bolt means formed from a high tensile, low ductile metal to substantially prevent separation of said bell housing and deflector plate from each other.

9. The safety housing of claim 8 including block bolt means of a soft, Grade 1 steel for connecting said bell housing and said deflector plate to said engine block.

10. The safety housing of claim 8 wherein said high tensile, low ductile steel is 4130 Cr-Mo steel.

* * * * *